(12) United States Patent
Kogure et al.

(10) Patent No.: US 12,734,979 B2
(45) **Date of Patent: *Sep. 15, 2026**

(54) WIRE HARNESS

(71) Applicant: Yazaki Corporation, Tokyo (JP)

(72) Inventors: Naoto Kogure, Shizuoka (JP); Hikaru Sano, Shizuoka (JP); Takeshi Onoda, Shizuoka (JP)

(73) Assignee: Yazaki Corporation, Tokyo (JP)

(*) Notice: Subject to any disclaimer, the term of this patent is extended or adjusted under 35 U.S.C. 154(b) by 204 days.

This patent is subject to a terminal disclaimer.

(21) Appl. No.: 18/736,004

(22) Filed: Jun. 6, 2024

(65) Prior Publication Data

US 2024/0317157 A1 Sep. 26, 2024

Related U.S. Application Data

(63) Continuation of application No. PCT/JP2023/005913, filed on Feb. 20, 2023.

(30) Foreign Application Priority Data

Feb. 28, 2022 (JP) ................................ 2022-028841

(51) Int. Cl.
*B60R 16/02* (2006.01)

(52) U.S. Cl.
CPC ................................ *B60R 16/0215* (2013.01)

(58) Field of Classification Search
None
See application file for complete search history.

(56) References Cited

U.S. PATENT DOCUMENTS 11,766,974 B2 * 9/2023 Long .................... B60N 2/0264 174/72 A
11,780,387 B2 * 10/2023 Kitahara ............. B60R 16/0215 174/72 A
2005/0095903 A1 * 5/2005 Stenzel ................ H02G 3/0475 439/501
2007/0148992 A1 * 6/2007 Sato .................... B60R 16/0207 439/34
2007/0148994 A1 * 6/2007 Sato .................... B60R 16/0215 439/34

(Continued)

FOREIGN PATENT DOCUMENTS

JP 2007-176232 A 7/2007
JP 2007-283949 A 11/2007

(Continued)

*Primary Examiner* — Krystal Robinson
(74) *Attorney, Agent, or Firm* — Sughrue Mion, PLLC

(57) ABSTRACT

A wire harness WH includes: a first protector that is disposed on a first link that is fixed, and has an opening; a second protector that is disposed on a second link rotatable relative to the first link and has an opening; an exterior member having a flexible cylindrical shape that includes a first end portion disposed in the opening of the first protector and a second end portion disposed in the opening of the second protector; an electric wire that is inserted through each of the first protector, the second protector, and the exterior member and is routed in the second link along a longitudinal direction of the second link; and a movable structure that allows the second end portion to move relative to the second link along the longitudinal direction.

6 Claims, 10 Drawing Sheets

(56) References Cited

U.S. PATENT DOCUMENTS

2014/0332265 A1* 11/2014 Nagayasu .............. H02G 11/00
174/72 A
2019/0071035 A1 3/2019 Sekino et al.
2023/0271568 A1* 8/2023 Maruchi .................. H02G 3/03
174/72 A
2023/0271574 A1* 8/2023 Kogure ...................... B60J 5/06
174/72 A

FOREIGN PATENT DOCUMENTS

JP 2009-213315 A 9/2009
JP 2013-031300 A 2/2013
JP 2019-047626 A 3/2019

* cited by examiner

100
Y
X
150
130
120b
120
160
170
VI
21a
C1
100A
110
2
3
11c
1
11
VI
WH 100
150
130
170
120b
120
160
WH
100A
2
21a
3
11c
VII
C1
110
1
11
X
Y

100
WH
Y
X
150
130
170
120b
120
100A
VIII
2
3
120a
160
11c
VIII
110
21a
C1
1
11

Z
Y
X
100
160
11d
11b
11
1
11a
31
11c
WH
3
140
32
21a
21
2
23
22
110
100A
120a
122
123a
22a
121
120
4
124
123

WH
Z
LD
1
2
3
4
5
11
11a
11c
15
21
21a
22
22a
22b
22c
23
31
32
G1
W1
θ
100A
110
120
120a
121
122
123
124
140

Z
121
123
22
22c
124
LD
23
2
G1
122
22a
21
22b
5
32
41
WH
F2
120
100A
3
4
110
140
11a
11c
120a
11
1

Z
121
22
22c
5
123a
124
LD
G1
2
122
22a
21
22b
120
32
21a
100A
4
WH
110
3
140
120a
11c
31
15
11a
11
1

Z
121
123
LD
124
F3
22
22c
5
23
123a
G1
122
2
θ
22a
21
AR1
22b
120
32
WH
21a
100A
3
110
4
140
120a

WIRE HARNESS

CROSS-REFERENCE TO RELATED APPLICATION (S)

This application is a continuation application of International Application PCT/JP2023/005913, filed on Feb. 20, 2023 which claims the benefit of priority from Japanese Patent Application No. 2022-028841 filed on Feb. 28, 2022 and designating the U.S., the entire contents of which are incorporated herein by reference.

BACKGROUND OF THE INVENTION

1. Field of the Invention

The present invention relates to a wire harness.

2. Description of the Related Art

Conventionally, there is a technique of accommodating an extra length of a wire harness. Japanese Patent Application Laid-open No. 2009-213315 discloses an extra length accommodating structure of a wire harness in which with respect to a first link rotatably supported by a shaft portion on a base and a second link rotatably supported by a shaft portion on a distal end side of the first link, a harness protector is disposed on the first link while being offset from a center of each shaft portion, a wire harness is slidably inserted into the harness protector, one side of the wire harness is fixed to a harness fixation portion on a base side, and an other side of the wire harness is fixed to a harness fixation portion on a second link side.

There is room for improvement in the wire harness that follows the rotational operation of a link mechanism. For example, in a case where both ends of an exterior member housing an electric wire are fixed to different links, there is a possibility that a load on the exterior member due to the rotational operation increases.

SUMMARY OF THE INVENTION

An object of the present invention is to provide a wire harness capable of reducing a load on an exterior member due to a rotational operation of a link mechanism.

Solution to Problem

A wire harness according to one aspect of the present invention includes a first protector that is disposed on a first link that is fixed, and has an opening; a second protector that is disposed on a second link rotatable relative to the first link and has an opening; an exterior member having a flexible cylindrical shape that includes a first end portion disposed in the opening of the first protector and a second end portion disposed in the opening of the second protector; an electric wire that is inserted through each of the first protector, the second protector, and the exterior member and is routed in the second link along a longitudinal direction of the second link; and a movable structure that allows the second end portion to move relative to the second link along the longitudinal direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a wire harness according to embodiments of the present invention will be described in detail with reference to the drawings. Note that the present invention is not limited to the embodiments. In addition, the components in the embodiments described below include those that can be easily assumed by those skilled in the art or those that are substantially the same.

First Embodiment

Figure 1:
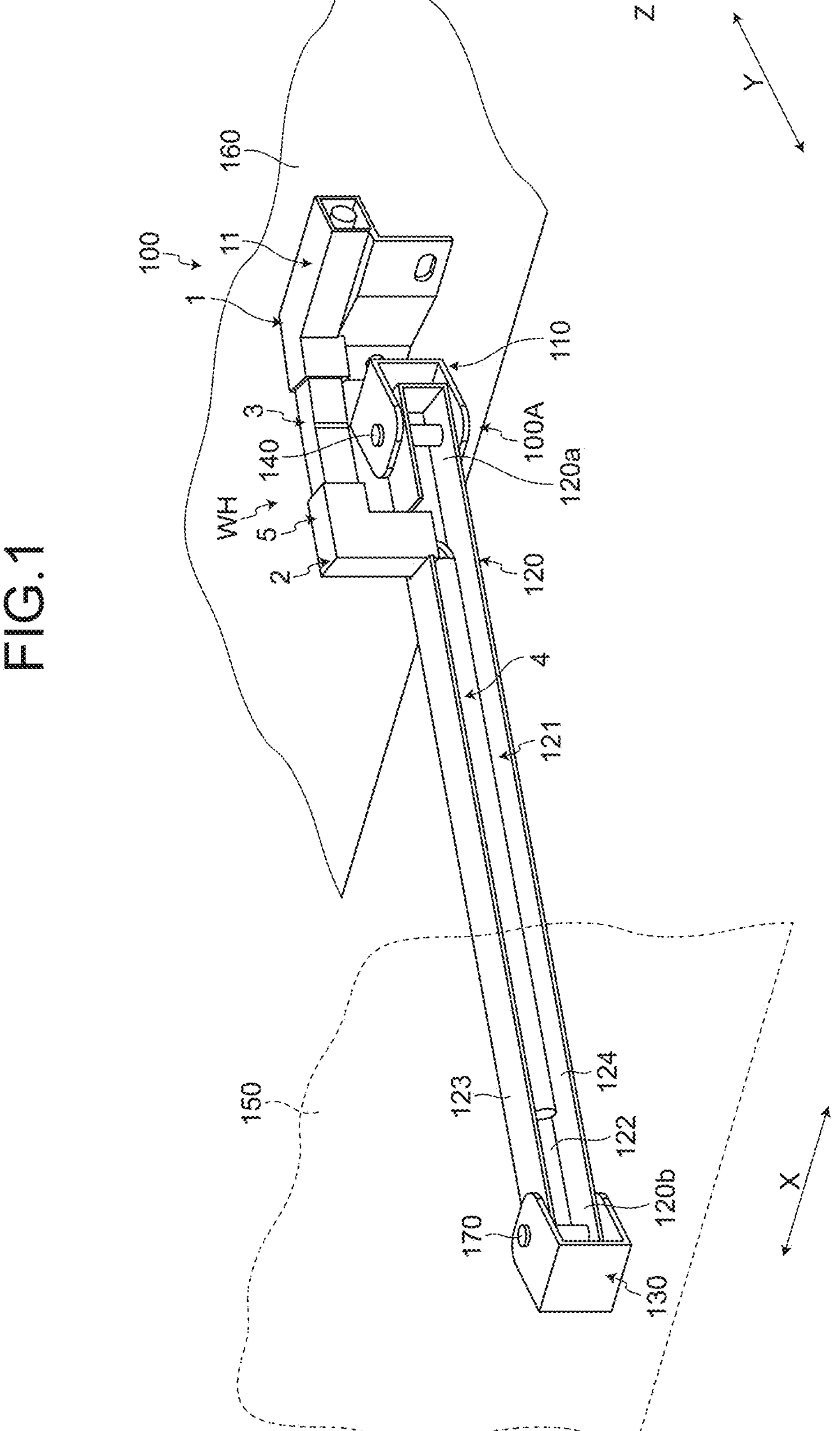
FIG. 1 is a perspective diagram illustrating a wire harness according to a first embodiment.
Figure 3:
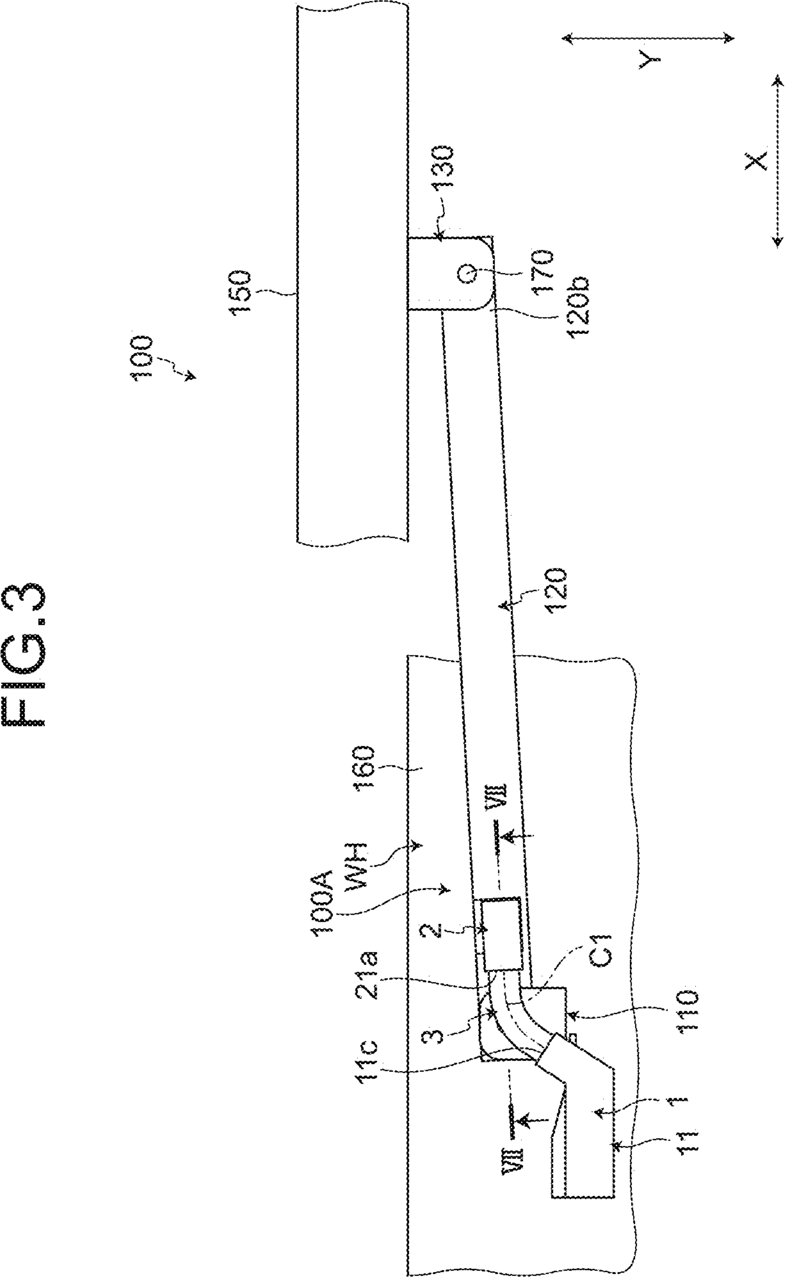
FIG. 3 is a plan diagram illustrating a wire harness in a fully closed position.
Figure 4:
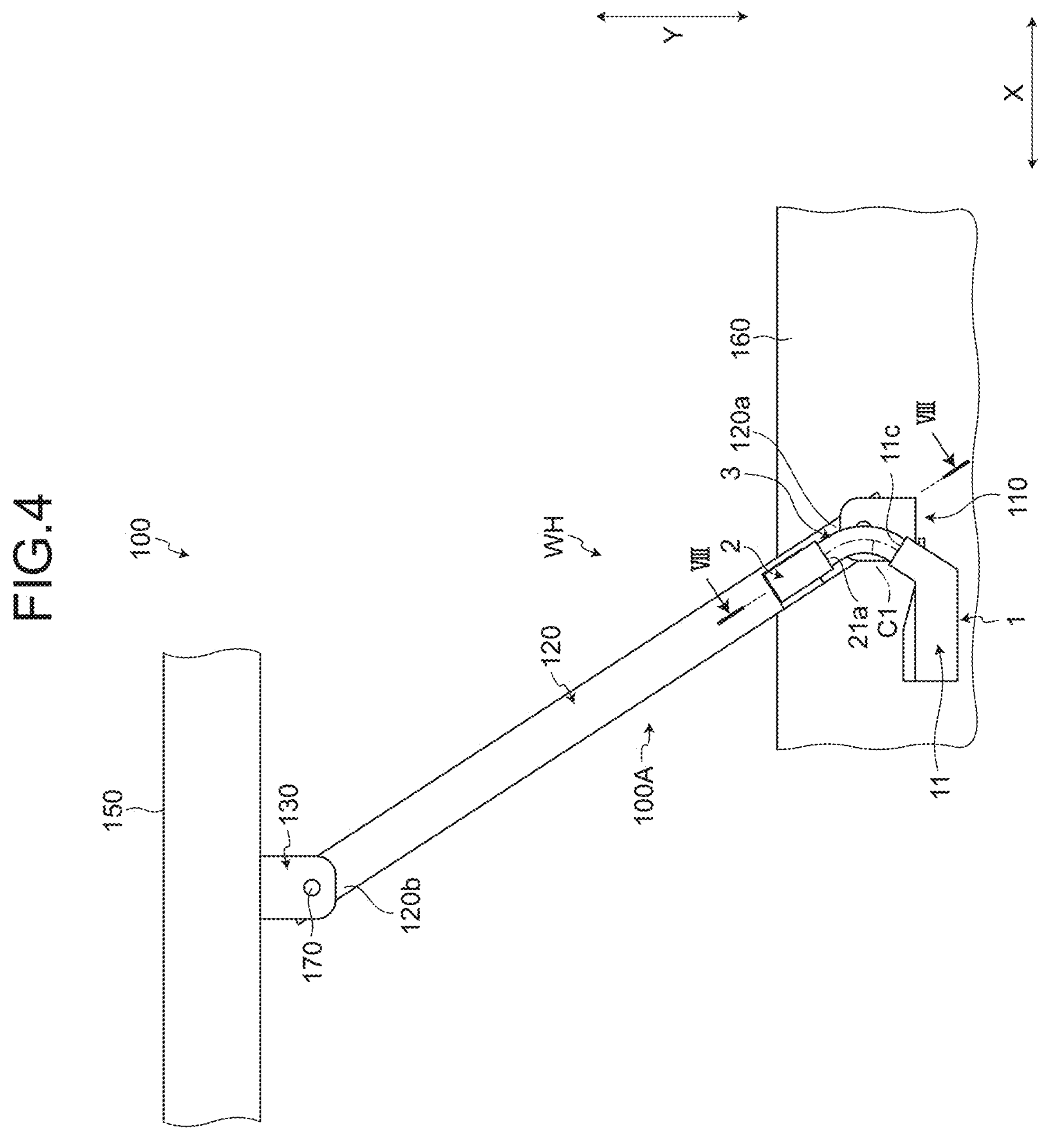
FIG. 4 is a plan diagram illustrating a wire harness in a fully open position.
Figure 5:
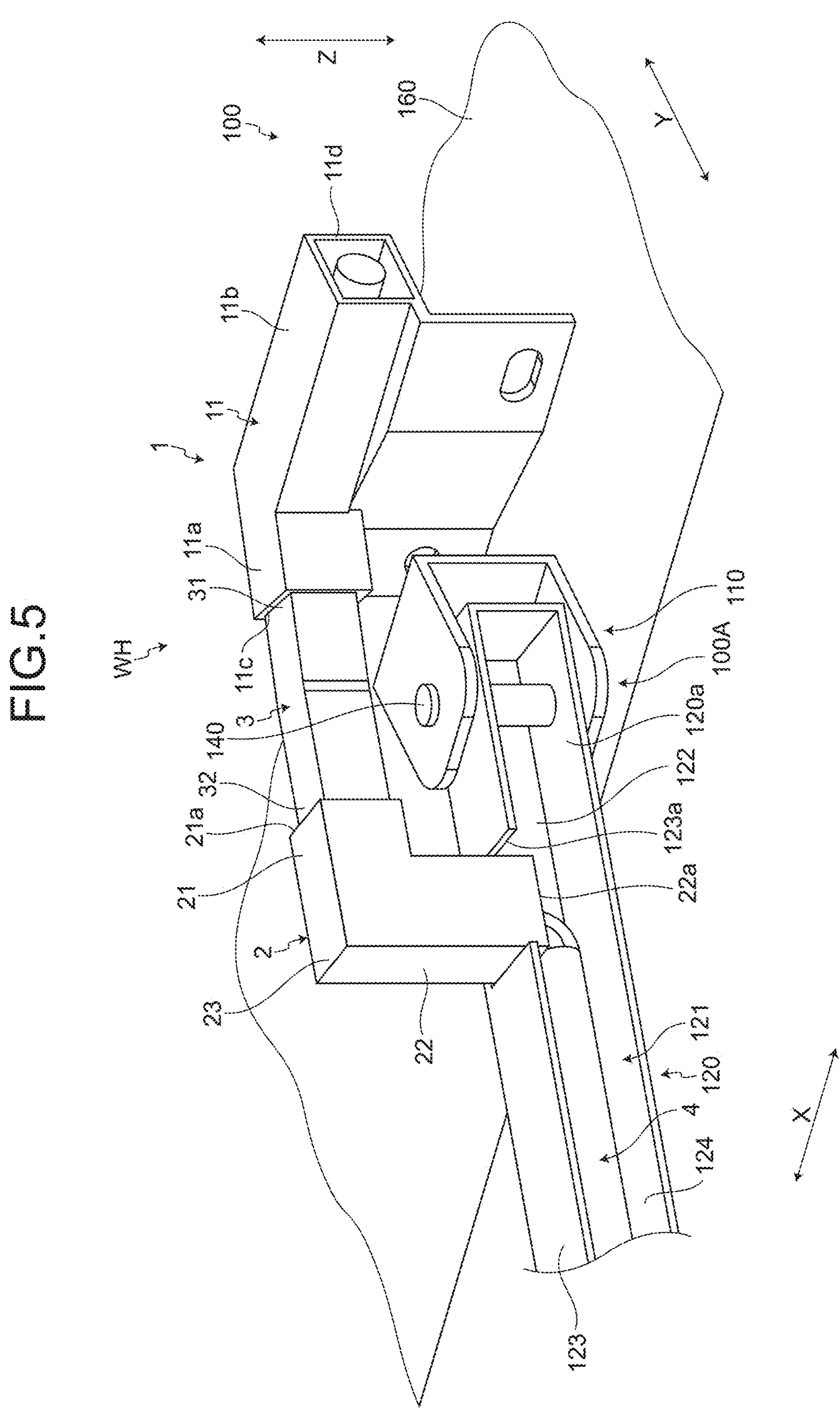
FIG. 5 is an enlarged perspective diagram of the wire harness according to the first embodiment.
Figure 7:
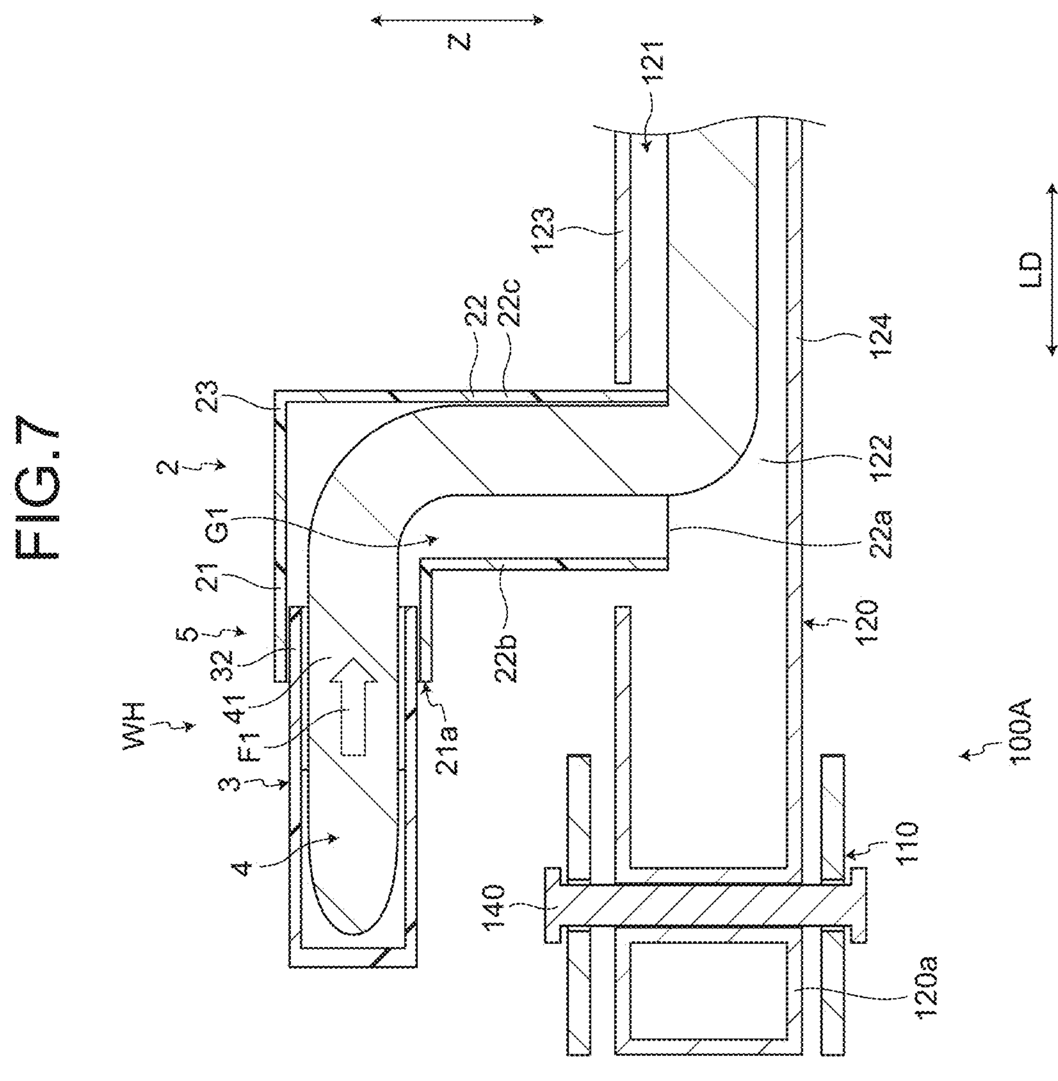
FIG. 7 is a cross-sectional diagram of the wire harness according to the first embodiment.
Figure 8:
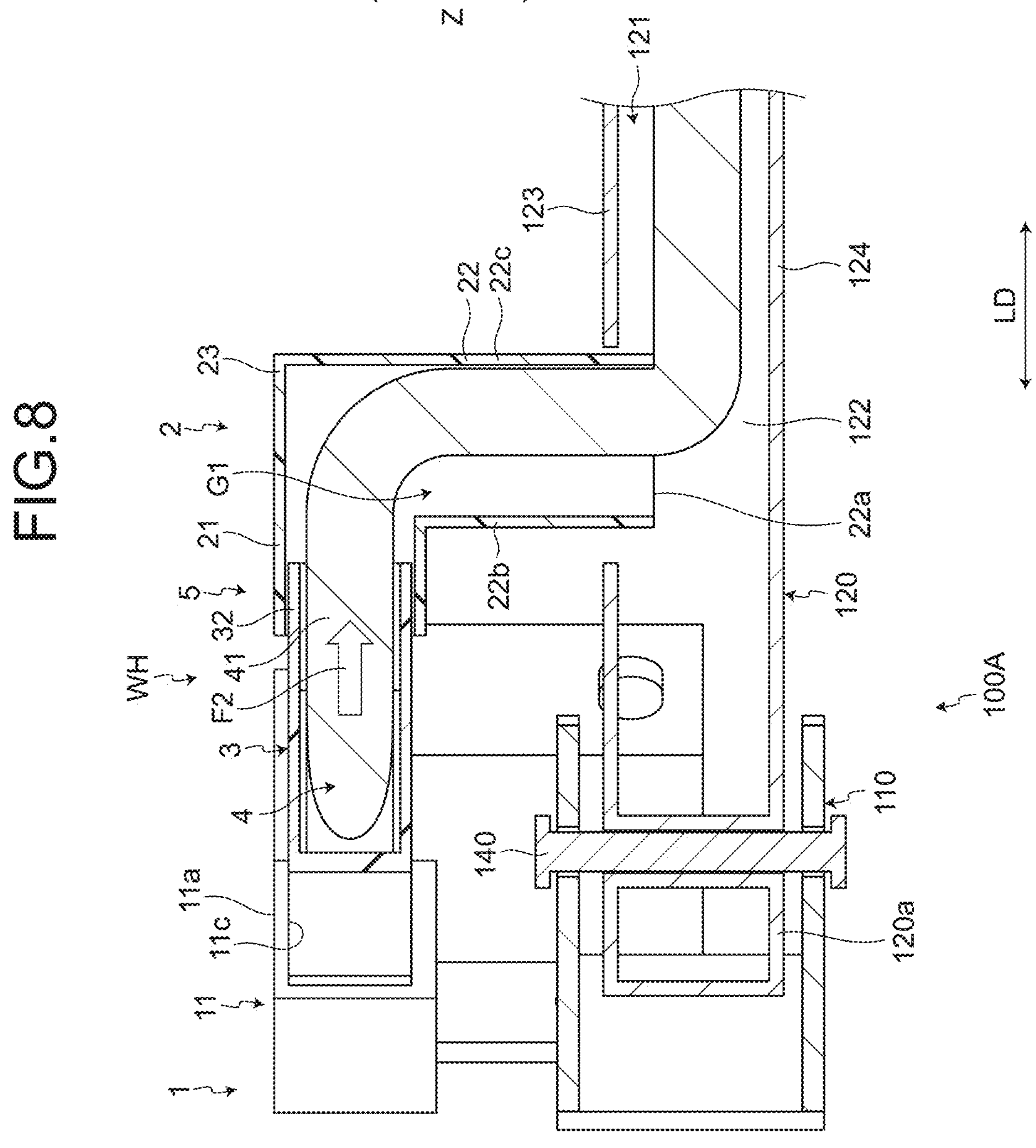
FIG. 8 is a cross-sectional diagram of the wire harness according to the first embodiment.

A first embodiment will be described with reference to FIGS. 1 to 8. The present embodiment relates to a wire harness. FIG. 1 is a perspective diagram illustrating a wire harness according to the first embodiment, FIG. 2 is a plan diagram illustrating the wire harness in a half-open position, FIG. 3 is a plan diagram illustrating the wire harness in a fully closed position, FIG. 4 is a plan diagram illustrating the wire harness in the fully open position, FIG. 5 is an enlarged perspective diagram of the wire harness according to the first embodiment, and FIGS. 6 to 8 are cross-sectional diagrams of the wire harness according to the first embodiment.

Figure 2:
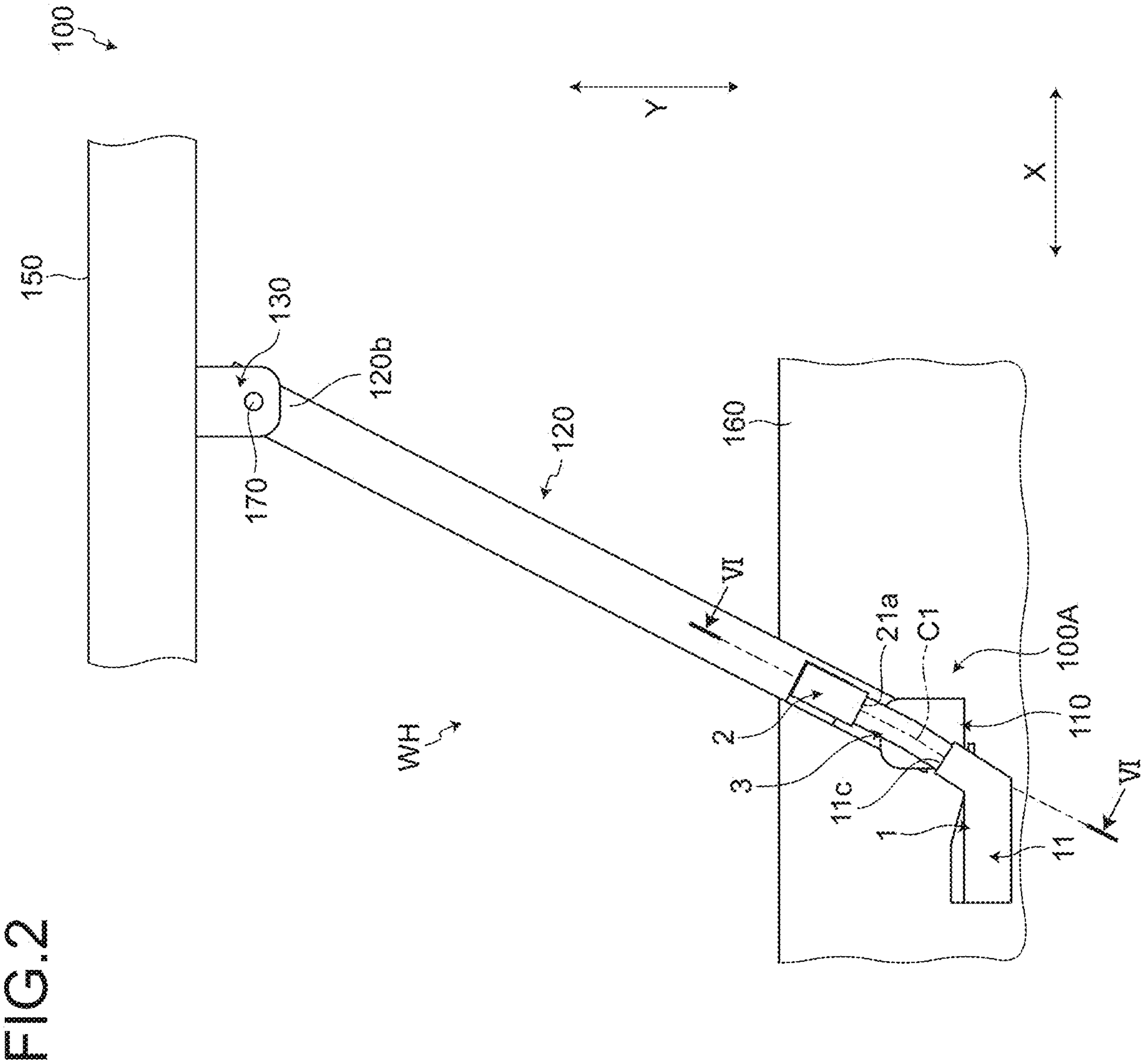
FIG. 2 is a plan diagram illustrating a wire harness in a half-open position.
Figure 6:
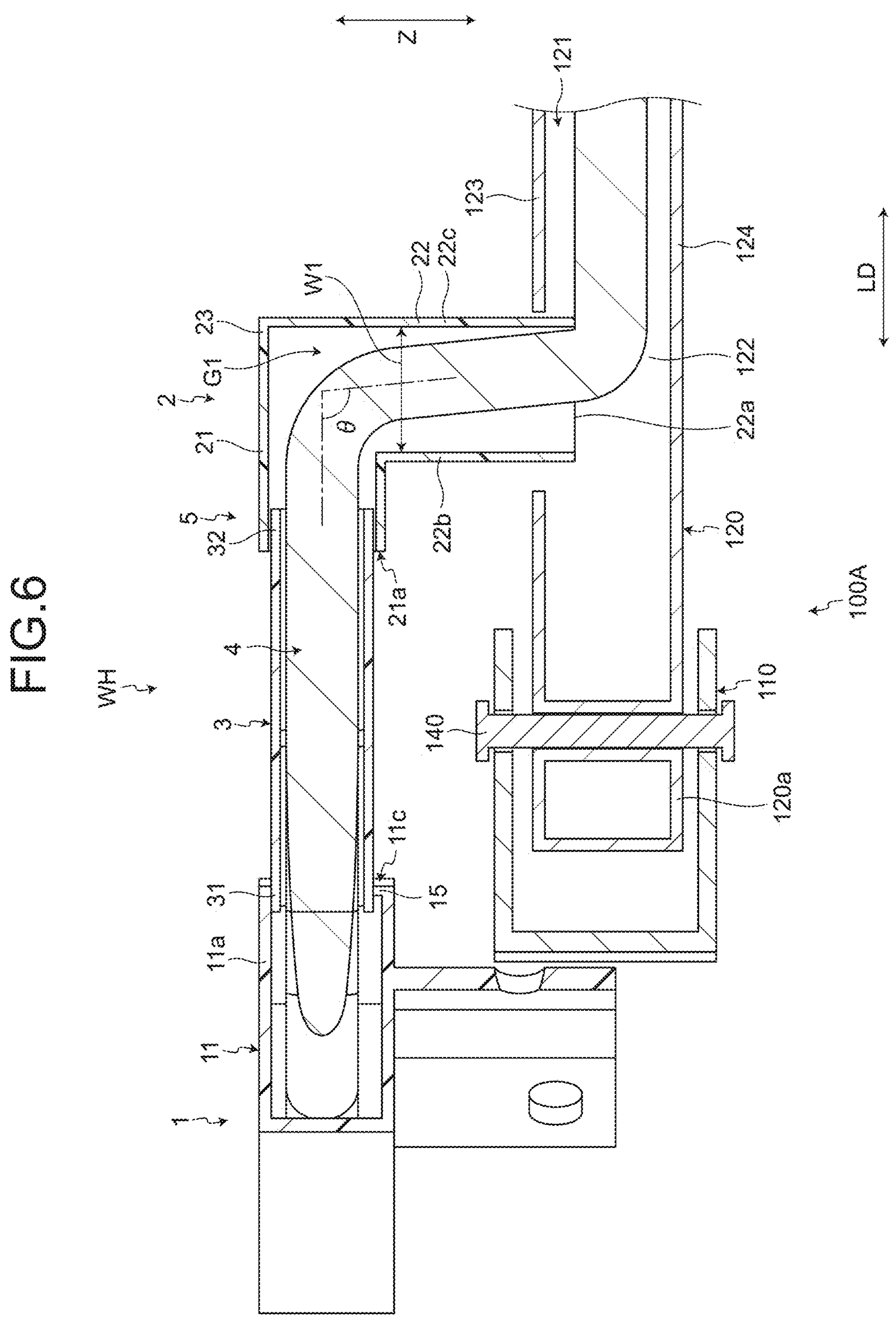
FIG. 6 is a cross-sectional diagram of the wire harness according to the first embodiment.

FIG. 6 illustrates a cross section taken along line VI-VI in FIG. 2. FIG. 7 illustrates a cross section taken along line VII-VII in FIG. 3. FIG. 8 illustrates a cross section taken along line VIII-VIII in FIG. 4.

As illustrated in FIG. 1, a wire harness WH of the present embodiment includes a first protector 1, a second protector 2, an exterior member 3, an electric wire 4, and a movable structure 5. The wire harness WH of the present embodiment is applied to, for example, a link mechanism 100A of a vehicle 100. The illustrated link mechanism 100A constitutes an opening and closing device that opens and closes a door 150 of the vehicle 100.

The link mechanism 100A includes a first link 110, a second link 120, a third link 130, and rotation shafts 140 and 170. The first link 110, the second link 120, and the third link 130 are formed of, for example, a metal plate. The first link

110 is a member fixed to a vehicle body 160 of the vehicle 100. The first link 110 is bent in a substantially U shape and is opened in a vehicle width direction Y.

The second link 120 is a member that rotates relative to the first link 110. The second link 120 is formed in a groove shape and has an internal space 121 in which the electric wire 4 is routed. The second link 120 has a bottom wall 122, a first sidewall 123, and a second sidewall 124. The first sidewall 123 and the second sidewall 124 are erected from edges of the bottom wall 122. The first sidewall 123 and the second sidewall 124 face each other in a width direction of the bottom wall 122. The bottom wall 122 and the two sidewalls 123 and 124 form the internal space 121. The illustrated second link 120 is disposed with the first sidewall 123 facing upward in a vehicle up-down direction Z and the second sidewall 124 facing downward.

The second link 120 has a base portion 120*a* and a distal end portion 120*b*. The base portion 120*a* is positioned at a first end portion of the second link 120 in the longitudinal direction. The distal end portion 120*b* is positioned at a second end portion of the second link 120 in the longitudinal direction. The base portion 120*a* is rotatably supported by the first link 110 via the rotation shaft 140. More specifically, the base portion 120*a* is inserted into the first link 110. The rotation shaft 140 penetrates the first sidewall 123 and the second sidewall 124 of the second link 120 and rotatably supports the second link 120. Both ends of the rotation shaft 140 are supported by the first link 110. An axial direction of the illustrated rotation shaft 140 is the vehicle up-down direction Z.

The second link 120 can rotate relative to the first link 110 about the rotation shaft 140. As illustrated in FIGS. 2 to 4, the second link 120 rotates so as to move the distal end portion 120*b* in a vehicle front-rear direction X. FIGS. 1 and 2 illustrate the link mechanism 100A when the door 150 is in the half-open position, FIG. 3 illustrates the link mechanism 100A when the door 150 is in the fully closed position, and FIG. 4 illustrates the link mechanism 100A when the door 150 is in the fully open position.

The third link 130 is coupled to the distal end portion 120*b* of the second link 120. The third link 130 is rotatably supported by the second link 120 via the rotation shaft 170. The third link 130 is connected to the door 150.

The first protector 1 and the second protector 2 are members that protect the electric wire 4 and restrict the path of the electric wire 4. The first protector 1 and the second protector 2 are molded from, for example, an insulating synthetic resin. As illustrated in FIG. 5, the first protector 1 is disposed on the first link 110. The first protector 1 may be fixed to the first link 110 or may be fixed to the vehicle body 160. The illustrated first protector 1 is disposed in contact with the first link 110.

The first protector 1 includes a first cylindrical portion 11 formed in a cylindrical shape. The first cylindrical portion 11 houses and protects the electric wire 4 and restricts the path of the electric wire 4. The shape of the first cylindrical portion 11 in plan view is a substantially V-shape or a substantially L-shape bent at an intermediate portion. The first cylindrical portion 11 has a first straight portion 11*a* and a second straight portion 11*b*. The first straight portion 11*a* and the second straight portion 11*b* each extend straight. The first straight portion 11*a* and the second straight portion 11*b* are connected so as to intersect in plan view. The shapes of the first straight portion 11*a* and the second straight portion 11*b* illustrated are rectangular cylindrical shapes.

The first straight portion 11*a* has an opening 11*c* opened toward the rotation shaft 140 side. The first protector 1 of the present embodiment is disposed such that the rotation shaft 140 is positioned on an extension line of the first straight portion 11*a* in plan view. For example, the first protector 1 is disposed such that a central axis of the first straight portion 11*a* intersects a central axis of the rotation shaft 140. The central axis of the first straight portion 11*a* and the central axis of the rotation shaft 140 may be orthogonal to each other. The second straight portion 11*b* has an opening 11*d*. The illustrated opening 11*d* opens in the vehicle front-rear direction X.

The second protector 2 is disposed on the second link 120. The first sidewall 123 of the second link 120 is provided with a cutout 123*a*. The cutout 123*a* is disposed in the base portion 120*a* or disposed in the vicinity of the base portion 120*a*. The shape of the cutout 123*a* in plan view is, for example, rectangular. The second protector 2 is disposed in the cutout 123*a* and is held by the cutout 123*a*.

The second protector 2 includes a second cylindrical portion 21, a third cylindrical portion 22, and a bent portion 23. The second cylindrical portion 21, the third cylindrical portion 22, and the bent portion 23 are each formed in a rectangular cylindrical shape. The second cylindrical portion 21 extends in the longitudinal direction of the second link 120 and opens toward the rotation shaft 140 side. That is, the second cylindrical portion 21 has an opening 21*a* facing the rotation shaft 140 side. The second protector 2 of the present embodiment is fixed to the second link 120 such that the rotation shaft 140 is positioned on an extension line of the second cylindrical portion 21 in plan view. For example, the second protector 2 is disposed such that a central axis of the second cylindrical portion 21 intersects the central axis of the rotation shaft 140. The central axis of the second cylindrical portion 21 and the central axis of the rotation shaft 140 may be orthogonal to each other.

The third cylindrical portion 22 extends in a direction orthogonal to the longitudinal direction of the second link 120 and is fitted in the cutout 123*a*. The illustrated third cylindrical portion 22 extends in the vehicle up-down direction Z. The third cylindrical portion 22 has an opening 22*a* facing the internal space 121 of the second link 120. The opening 22*a* faces the second sidewall 124.

The bent portion 23 is positioned between the second cylindrical portion 21 and the third cylindrical portion 22, and connects the second cylindrical portion 21 and the third cylindrical portion 22. The illustrated bent portion 23 is bent at a right angle. That is, in the second protector 2 of the present embodiment, the second cylindrical portion 21 and the third cylindrical portion 22 are orthogonal to each other.

The exterior member 3 is a flexible cylindrical member for housing and protecting the electric wire 4. The exterior member 3 is molded from, for example, an insulating synthetic resin. As illustrated in FIGS. 3 and 4, the exterior member 3 can be flexurally deformed so as to curve a central axis C1 in plan view. The exterior member 3 has rigidity in a direction along the central axis C1.

The exterior member 3 may be, for example, a member having a rectangular cylindrical shape configured to be bendable. Such an exterior member having a rectangular cylindrical shape is provided with, for example, a plurality of cut lines so as to be bendable. The exterior member having a rectangular cylindrical shape can be flexurally deformed while maintaining the length along the direction of the central axis C1.

The exterior member 3 may be configured by arranging a plurality of frame members along the central axis C1. In such an exterior member 3, two adjacent frame members are coupled to each other so as to be relatively rotatable. The exterior member 3 of the coupling type can be flexurally deformed while maintaining the length along the direction of the central axis C1.

The exterior member 3 may be a corrugated tube. The corrugated tube is formed to have suitable rigidity along the central axis C1. The corrugated tube may be formed to be capable of flexural deformation while maintaining the length along the direction of the central axis C1.

The exterior member 3 has a first end portion 31 and a second end portion 32. The first end portion 31 is disposed on the first protector 1. The second end portion 32 is disposed on the second protector 2. In the wire harness WH of the present embodiment, the first end portion 31 is fixed to the first protector 1, and the second end portion 32 is slidably inserted into the second protector 2.

Here, in the link mechanism 100A of the present embodiment, the line length between the two links 110 and 120 changes as a result of the relative rotation of the second link 120 with respect to the first link 110. For example, when the second protector 2 is fixed to the second link 120, the line length between the first protector 1 and the second protector 2 changes. In the rotation position illustrated in FIG. 2, the opening 11*c* of the first protector 1 and the opening 21*a* of the second protector 2 face each other, and the exterior member 3 has a straight shape. In this case, the line length between the first protector 1 and the second protector 2 is maximized.

On the other hand, in the fully closed rotation position illustrated in FIG. 3 and the fully open rotation position illustrated in FIG. 4, the direction of the opening 11*c* and the direction of the opening 21*a* intersect. In this case, the linear distance between the opening 11*c* and the opening 21*a* is shorter than in the case of the rotation position in FIG. 2. That is, the line length between the opening 11*c* and the opening 21*a* in the fully closed position and the fully open position is shorter than the line length in the case of the rotation position in FIG. 2.

As described below, the wire harness WH of the present embodiment has the movable structure 5 that reduces a load on the exterior member 3 due to the rotational operation of the second link 120. FIG. 6 illustrates the first protector 1, the second protector 2, the exterior member 3, and the electric wire 4 in the rotation position in FIG. 2. The movable structure 5 includes the second end portion 32 of the exterior member 3 and the second cylindrical portion 21 of the second protector 2.

More specifically, the movable structure 5 is a fitting structure in which the second end portion 32 and the second cylindrical portion 21 are slidably fitted. As illustrated in FIG. 6, the second cylindrical portion 21 of the second protector 2 extends toward the first protector 1 side. The second end portion 32 of the exterior member 3 is inserted into the second cylindrical portion 21 so as to be slidable with respect to the second cylindrical portion 21. That is, the second end portion 32 is movable forward and backward with respect to the second cylindrical portion 21 along the axial direction of the second cylindrical portion 21.

The first end portion 31 of the exterior member 3 is fixed to the first protector 1. The first straight portion 11*a* of the first protector 1 has a protrusion 15 that holds the exterior member 3. The protrusion 15 protrudes from an inner wall surface of the first straight portion 11*a*. The first end portion 31 of the exterior member 3 is inserted into the first straight portion 11*a* and locked by the protrusion 15. The protrusion 15 holds the first end portion 31 so that the first end portion 31 does not move relative to the first straight portion 11*a*.

As illustrated in FIGS. 1, 5, and 6, the electric wire 4 is inserted through each of the first protector 1, the second protector 2, and the exterior member 3. The illustrated electric wire 4 connects a device on the vehicle body 160 side and a device on the door 150 side. The electric wire 4 is configured by, for example, bundling a power supply line and a signal line. One end of the electric wire 4 is led out from the opening 11*d* of the first protector 1. The electric wire 4 led out from the opening 11*d* is connected to a power source and a control device of the vehicle 100. The other end of the electric wire 4 is routed in the internal space 121 of the second link 120 and connected to a device disposed in the door 150. The electric wire 4 is routed in the second link 120 along the longitudinal direction of the second link 120. In the description below, the longitudinal direction of the second link 120 is simply referred to as "longitudinal direction LD".

As illustrated in FIG. 6, the electric wire 4 is routed inside the first protector 1, inside the exterior member 3, inside the second protector 2, and the internal space 121 of the second link 120. The electric wire 4 is curved inside the second protector 2. More specifically, the electric wire 4 is curved along the shape of the bent portion 23 inside the bent portion 23. The electric wire 4 illustrated in FIG. 6 is bent at the bent portion 23 such that an angle θ formed by the central axis becomes an obtuse angle. The electric wire 4 is further curved at the opening 22*a* of the second protector 2. The electric wire 4 is led out from the internal space 121 at the distal end portion 120*b* of the second link 120 and connected to a device on the door 150 side.

The third cylindrical portion 22 of the second protector 2 has an inner wall 22*b* and an outer wall 22*c*. The inner wall 22*b* and the outer wall 22*c* face each other in the longitudinal direction LD. That is, the inner wall 22*b* and the outer wall 22*c* face each other in a radial direction when the second link 120 performs the rotational movement. The inner wall 22*b* is positioned closer to the rotation shaft 140 than the outer wall 22*c* to the rotation shaft 140. That is, the inner wall 22*b* is positioned closer to the center side in the radial direction described above than the outer wall 22*c* to the center side.

A distance W1 between the inner wall 22*b* and the outer wall 22*c* is larger than the diameter of the electric wire 4. Accordingly, the electric wire 4 can extend in a direction inclined with respect to the vehicle up-down direction Z inside the third cylindrical portion 22.

The second protector 2 is configured to be able to house an extra length of the electric wire 4 generated when the second link 120 rotates. As illustrated in FIG. 6, a gap G1 is provided between an outer peripheral surface of the electric wire 4 and the inner wall surface of the second protector 2. The gap G1 is formed at least between the inner wall surface of the third cylindrical portion 22 and the electric wire 4.

The electric wire 4 is fixed on each of the vehicle body 160 side and the second link 120 side. An object to which the electric wire 4 on the vehicle body 160 side is fixed is, for example, the first protector 1. The electric wire 4 is fixed to the first protector 1 by, for example, a binding member such as a band or a tape. An object to which the electric wire 4 on the second link 120 side is fixed is, for example, the second protector 2. The electric wire 4 is fixed to the second protector 2 by, for example, a binding member such as a band or a tape. For example, the electric wire 4 is fixed to the second protector 2 at the portion of the opening 22*a*. The electric wire 4 may be fixed to the outer wall 22*c*.

FIG. 7 illustrates the second protector 2 and the electric wire 4 when the second link 120 is in the fully closed position. As described above, in the fully closed position and the fully open position, the line length between the first protector 1 and the second protector 2 becomes short. For example, when the second link 120 rotates from the half-open position toward the fully closed position, as illustrated in FIG. 7, a force F1 toward the second protector 2 side along the longitudinal direction LD acts on the exterior member 3 and the electric wire 4.

The second end portion 32 of the exterior member 3 is pushed toward the inside of the second cylindrical portion 21 by the force F1. The exterior member 3 follows the second link 120 rotating toward the fully closed position by moving toward the outer wall 22*c* while sliding with respect to the second cylindrical portion 21. Since the exterior member 3 is slidable with respect to the second cylindrical portion 21, the load on the exterior member 3 due to a change in line length is reduced.

As a comparative example, a configuration in which the second end portion 32 is fixed to the second cylindrical portion 21 in a non-slidable manner will be examined. In this case, a stress in the axial direction is generated in the exterior member 3 as a result of the rotation of the second link 120. Further, the exterior member 3 needs to be flexurally deformed to follow the rotation of the second link 120. As a result, a large load may be applied to the exterior member 3 by the rotational operation of the link mechanism 100A. On the other hand, in the wire harness WH of the present embodiment, the stress generated in the exterior member 3 can be reduced by the movable structure 5.

FIG. 8 illustrates the second protector 2 and the electric wire 4 when the second link 120 is in the fully open position. When the second link 120 rotates from the half-open position toward the fully open position, as illustrated in FIG. 8, a force F2 toward the second protector 2 side along the longitudinal direction LD acts on the exterior member 3 and the electric wire 4.

The second end portion 32 of the exterior member 3 is pushed toward the inside of the second cylindrical portion 21 by the force F2. The exterior member 3 follows the second link 120 rotating toward the fully open position by moving toward the outer wall 22*c* while sliding with respect to the second cylindrical portion 21. Thus, the movable structure 5 can reduce the stress of the exterior member 3 when the second link 120 rotates toward the fully open position.

When the second link 120 rotates from the fully closed position or the fully open position toward the half-open position illustrated in FIG. 2, the line length between the first protector 1 and the second protector 2 becomes long. In this case, a force in a direction opposite to the forces F1 and F2 acts on the exterior member 3 and the electric wire 4. Thus, the second end portion 32 of the exterior member 3 slides with respect to the second cylindrical portion 21 in a direction of coming out of the second cylindrical portion 21. That is, the exterior member 3 follows the second link 120 rotating toward the half-open position by sliding with respect to the second cylindrical portion 21 so as to be away from the outer wall 22*c*.

As described above, the fitting structure including the second end portion 32 and the second cylindrical portion 21 accommodates a change in line length caused by the rotation of the second link 120. Thus, the wire harness WH of the present embodiment can reduce the load on the exterior member 3 due to the rotational operation of the link mechanism 100A.

In addition, the wire harness WH of the present embodiment can accommodate the extra length generated in the electric wire 4. As illustrated in FIG. 6, a gap G1 is provided between an outer peripheral surface of the electric wire 4 and the inner wall surface of the second protector 2. The internal space of the second protector 2 functions as a housing space for housing an extra length of the electric wire 4 generated as a result of the rotation of the second link 120.

As illustrated in FIG. 6, when the second link 120 is in the half-open position, the electric wire 4 extends obliquely inside the third cylindrical portion 22. More specifically, the electric wire 4 is inclined with respect to the vehicle up-down direction Z so as to be directed toward the outer wall 22*c* as approaching the opening 22*a* from the second cylindrical portion 21. At this time, the electric wire 4 is inclined with respect to the outer wall 22*c*. The gap between the electric wire 4 and the outer wall 22*c* increases toward the second cylindrical portion 21 along the vehicle up-down direction Z.

As illustrated in FIG. 7, when the second link 120 is in the fully closed position, the electric wire 4 is pushed to the inside of the second protector 2 by the force F1. As a result, an extra length is generated in the electric wire 4. In the description below, a portion of the electric wire 4 that is pushed to the inside of the second protector 2 by the rotation of the second link 120 is referred to as an extra length portion 41. The extra length generated by the rotation of the second link 120 corresponds to the length of the extra length portion 41.

The second protector 2 houses the extra length portion 41 of the electric wire 4. As illustrated in FIG. 7, the electric wire 4 is housed in the third cylindrical portion 22 so as to extend along the outer wall 22*c*. At this time, the electric wire 4 can extend in parallel with the outer wall 22*c* in the third cylindrical portion 22. That is, when the second link 120 rotates toward the fully closed position, the electric wire 4 moves toward the outer wall 22*c* inside the second protector 2 and changes the angle of the curved portion. The second protector 2 has a housing space capable of allowing the movement of the electric wire 4 and a change in bending angle of the electric wire 4. Thus, the second protector 2 can house the extra length portion 41 of the electric wire 4 and cause the electric wire 4 to follow the rotation of the second link 120.

As illustrated in FIG. 8, even when the second link 120 is in the fully open position, the electric wire 4 is housed in the third cylindrical portion 22 so as to extend along the outer wall 22*c*. That is, the second protector 2 can house the extra length portion 41 generated when the second link 120 rotates toward the fully open position and cause the electric wire 4 to follow the rotation of the second link 120.

As illustrated in FIGS. 7 and 8, when the second link 120 is in the fully closed position and the fully open position, the electric wire 4 is separated from the inner wall 22*b*. Accordingly, when the second link 120 rotates toward the half-open position, the electric wire 4 can follow the rotation of the second link 120 while letting out the extra length portion 41 from the second cylindrical portion 21.

Note that the housing space for housing the extra length of the electric wire 4 may be provided in the routing path on the first link 110 side. For example, the internal space of the first protector 1 may house the extra length portion as the housing space. The housing space may be provided in any one of the routing path on the first link 110 side and the routing path on the second link 120 side, or may be provided in both the routing paths.

As described above, the wire harness WH of the present embodiment includes the first protector 1, the second protector 2, the exterior member 3 having a flexible cylindrical shape, the electric wire 4, and the movable structure 5. The first protector 1 is disposed on the fixed first link 110 and has the opening 11*c*. The second protector 2 is disposed on the second link 120 that is relatively rotatable with respect to the first link 110, and has the opening 21*a*. The exterior member 3 includes the first end portion 31 disposed in the opening 11*c* of the first protector 1 and the second end portion 32 disposed in the opening 21*a* of the second protector 2. The electric wire 4 is inserted through each of the first protector 1, the second protector 2, and the exterior member 3. The electric wire 4 is routed in the second link 120 along the longitudinal direction LD of the second link 120.

The movable structure 5 is a structure that allows the second end portion 32 to relatively move along the longitudinal direction LD with respect to the second link 120. The wire harness WH of the present embodiment can reduce the load acting on the exterior member 3 by relatively moving the second end portion 32 of the exterior member 3 with respect to the second link 120.

The second protector 2 of the present embodiment includes the second cylindrical portion 21 that extends toward the first protector 1 side. The movable structure 5 is a fitting structure in which the second end portion 32 of the exterior member 3 and the second cylindrical portion 21 are slidably fitted. The slidable fitting structure can achieve smooth followability with respect to the rotational operation of the link mechanism 100A. Note that, in the fitting structure of the present embodiment, the second end portion 32 is inserted into the second cylindrical portion 21, but conversely, the second cylindrical portion 21 may be inserted into the second end portion 32.

The exterior member 3 is configured to be flexurally deformed while maintaining the length along the direction of the central axis C1 of the exterior member 3. Since the exterior member 3 has rigidity in the axial direction, the movable structure 5 functions appropriately, and the load on the exterior member 3 is reduced.

Second Embodiment

Figure 9:
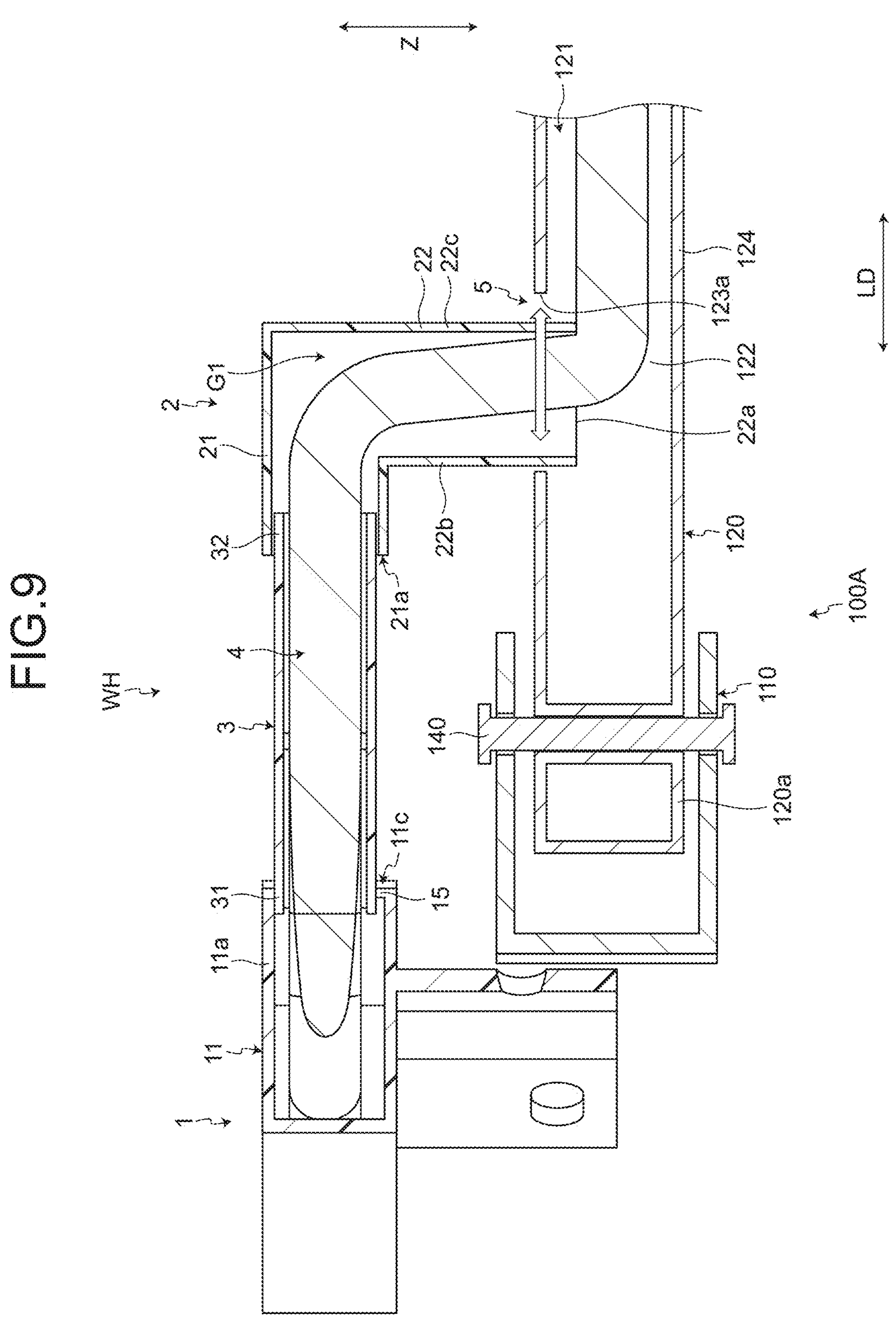
FIG. 9 is a cross-sectional diagram describing a movable structure according to a second embodiment.
Figure 10:
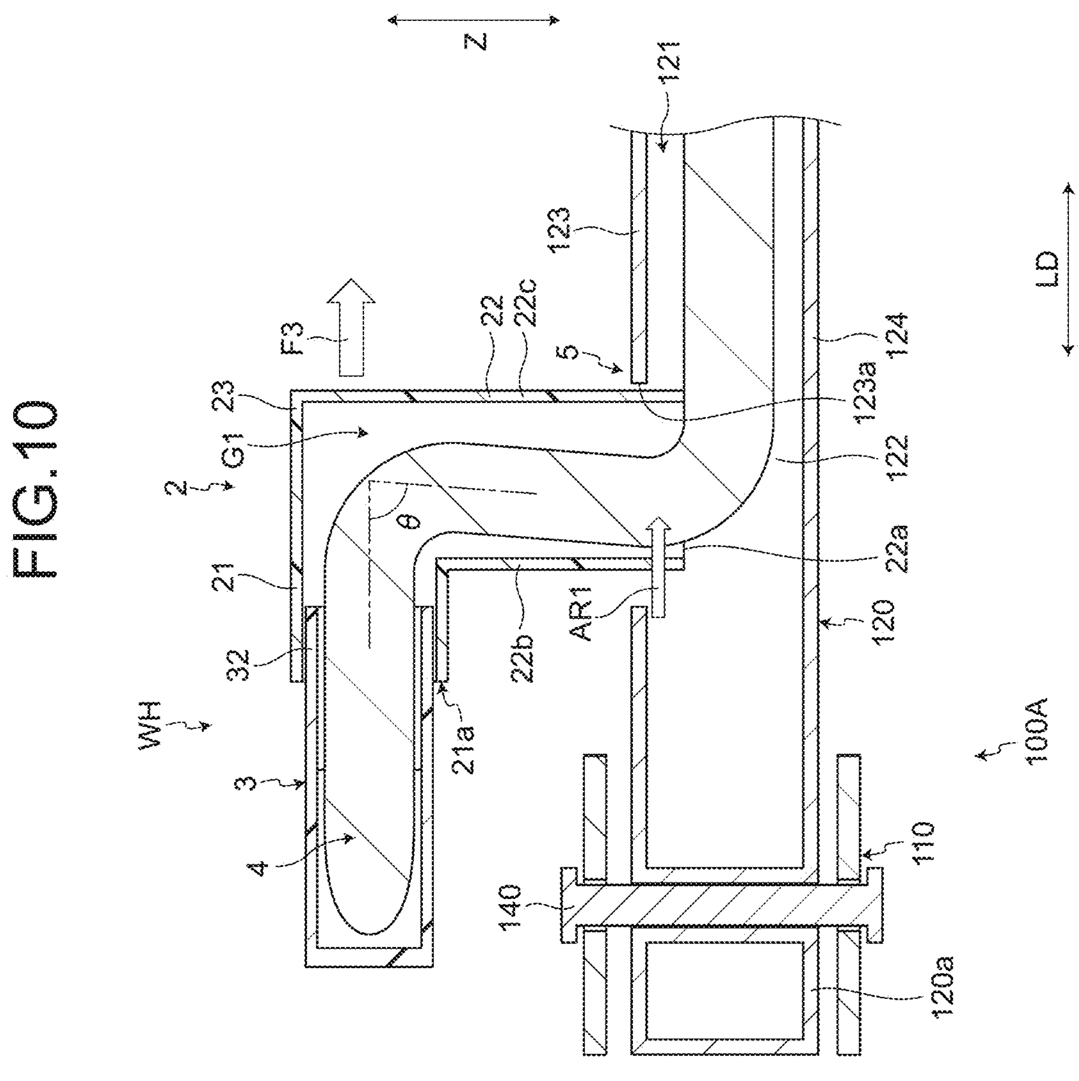
FIG. 10 is a cross-sectional diagram describing the movable structure according to the second embodiment.

A second embodiment will be described with reference to FIGS. 9 and 10. In the second embodiment, components having functions similar to those described in the first embodiment described above are denoted by the same reference numerals, and redundant description is omitted. FIGS. 9 and 10 are cross-sectional diagrams describing a movable structure according to the second embodiment. The second embodiment is different from the first embodiment described above in that, for example, the second protector 2 is slidable with respect to the second link 120.

As described with reference to FIGS. 9 and 10, the movable structure 5 of the second embodiment is a slide structure. More specifically, the movable structure 5 of the second embodiment is a slide structure that allows the second protector 2 to move relative to the second link 120 along the longitudinal direction LD. The second link 120 supports the second protector 2 so that the second protector 2 can relatively move along the longitudinal direction LD. The second link 120 may be provided with a guide groove or a guide rail that guides the second protector 2 along the longitudinal direction LD. In this case, the second protector 2 is preferably provided with a rib corresponding to the guide groove and a recess corresponding to the guide rail.

FIG. 9 illustrates a cross section when the second link 120 is in the half-open position. In the wire harness WH of the second embodiment, the second end portion 32 of the exterior member 3 is fixed to the second cylindrical portion 21 of the second protector 2. Accordingly, the exterior member 3 of the second embodiment cannot move relative to the second protector 2 in the longitudinal direction LD. Similarly to the exterior member of the first embodiment described above, the exterior member 3 can be flexurally deformed while maintaining the length along the direction of the central axis C1. In the second embodiment, an object to which the electric wire 4 on the second link 120 side is fixed is, for example, the second protector 2. The electric wire 4 is fixed to the second cylindrical portion 21, for example. The electric wire 4 may be fixed to the second link 120 inside the second link 120.

The movable range of the second protector 2 in the longitudinal direction LD is defined by, for example, the width of the cutout 123*a*. When the second link 120 is in the half-open position, the position of the second protector 2 is an end portion on the rotation shaft 140 side in the movable range. At this time, the electric wire 4 is inclined inside the second protector 2. More specifically, the electric wire 4 is inclined with respect to the vehicle up-down direction Z so as to approach the outer wall 22*c* toward the opening 22*a* inside the third cylindrical portion 22.

FIG. 10 illustrates a cross section when the second link 120 is in the fully closed position. When the second link 120 rotates from the half-open position toward the fully closed position, a force F3 acts on the second protector 2 from the exterior member 3 as illustrated in FIG. 10. The force F3 is a force in a direction away from the rotation shaft 140 along the longitudinal direction LD.

The second protector 2 slides in a direction indicated by an arrow AR1 by the force F3. When the second link 120 is in the fully closed position, the position of the second protector 2 is an end portion on a side far from the rotation shaft 140 in the movable range. The movable range of the second protector 2 is determined so as to be able to accommodate a change in line length when the second link 120 rotates from the half-open position to the fully closed position.

In addition, the second protector 2 slides in the longitudinal direction LD to accommodate a change in line length when the second link 120 rotates from the half-open position to the fully open position. The movable range of the second protector 2 is determined so as to be able to accommodate a change in line length when the second link 120 rotates from the half-open position to the fully open position. Thus, the movable structure 5 of the second embodiment can accommodate a change in line length generated when the second link 120 rotates between the fully closed position and the fully open position, and can reduce the load on the exterior member 3.

As illustrated in FIG. 10, when the second link 120 is in the fully closed position, the electric wire 4 is inclined inside the second protector 2. The inclination direction of the electric wire 4 in the third cylindrical portion 22 is different from the inclination direction illustrated in FIG. 9. More specifically, the electric wire 4 is inclined with respect to the vehicle up-down direction Z so as to approach the inner wall 22*b* toward the opening 22*a* inside the third cylindrical portion 22. The electric wire 4 illustrated in FIG. 10 is bent at the bent portion 23 such that an angle θ formed by the central axis becomes an acute angle. That is, the second protector 2 can accommodate the extra length of the electric wire 4 generated as a result of the rotation of the second link 120.

The second protector 2 can accommodate the extra length of the electric wire 4 even when the second link 120 is in the fully open position. When the second link 120 is in the fully open position, the shape of the electric wire 4 inside the second protector 2 is similar to that illustrated in FIG. 10. As described above, the wire harness WH of the second embodiment accommodates the extra length of the electric wire 4 by changing the curved shape of the electric wire 4 inside the second protector 2. Thus, the wire harness WH of the second embodiment can accommodate the extra length of the electric wire 4 generated when the second link 120 rotates between the fully closed position and the fully open position, and can improve the followability of the electric wire 4 with respect to the second link 120.

As described above, the movable structure 5 of the second embodiment is a slide structure that allows the second protector 2 to move relative to the second link 120 along the longitudinal direction LD. Such a slide structure can reduce the load on the exterior member 3 due to the rotational operation of the link mechanism 100A.

Note that the link mechanism 100A to which the wire harness WH of the first embodiment and the second embodiment is applied is not limited to a mechanism for opening and closing the door 150. The link mechanism 100A is not limited to a mechanism mounted on the vehicle 100.

The contents disclosed in the embodiments described above can be appropriately combined and executed.

A wire harness according to the embodiment has a movable structure that allows a second end portion of an exterior member to relatively move along a longitudinal direction with respect to a second link. The wire harness of the embodiment provides an effect of being capable of reducing a load on the exterior member due to the rotational operation of the link mechanism.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:

a first protector that is disposed on a first link that is fixed to a vehicle body, and has an opening;

a second protector that is disposed on a second link rotatable relative to the first link and has an opening;

a flexible exterior member having a cylindrical shape and configured to be bendable that includes a first end portion disposed in the opening of the first protector and a second end portion disposed in the opening of the second protector;

an electric wire that is inserted through each of the first protector, the second protector, and the exterior member and is routed in the second link along a longitudinal direction of the second link; and a movable structure including the second end portion of the exterior member and a cylindrical portion of the second protector, the movable structure allowing the second end portion to move relative to the second link along the longitudinal direction.

2. The wire harness according to claim 1, wherein the second protector includes a cylindrical portion extending toward a side of the first protector, and the movable structure is a fitting structure in which the second end portion and the cylindrical portion of the second protector are slidably fitted.

3. The wire harness according to claim 1, wherein the movable structure is a slide structure that allows the second protector to move relative to the second link along the longitudinal direction.

4. The wire harness according to claim 1, wherein the exterior member is configured to be flexurally deformed while substantially maintaining a length along an axial direction of the exterior member.

5. The wire harness according to claim 2, wherein the exterior member is configured to be flexurally deformed while substantially maintaining a length along an axial direction of the exterior member.

6. The wire harness according to claim 3, wherein the exterior member is configured to be flexurally deformed while substantially maintaining a length along an axial direction of the exterior member.

* * * * *